(12) United States Patent
Xu et al.

(10) Patent No.: US 11,722,678 B2
(45) Date of Patent: Aug. 8, 2023

(54) METHOD AND APPARATUS FOR TRANSFORM SKIP COEFFICIENTS CODING

(71) Applicant: TENCENT AMERICA LLC, Palo Alto, CA (US)

(72) Inventors: Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/325,606

(22) Filed: May 20, 2021

(65) Prior Publication Data
US 2022/0070471 A1    Mar. 3, 2022

Related U.S. Application Data

(60) Provisional application No. 63/070,023, filed on Aug. 25, 2020.

(51) Int. Cl.
*H04N 19/159* (2014.01)
*H04N 19/167* (2014.01)
*H04N 19/176* (2014.01)

(52) U.S. Cl.
CPC ......... *H04N 19/159* (2014.11); *H04N 19/167* (2014.11); *H04N 19/176* (2014.11)

(58) Field of Classification Search
CPC .... H04N 19/176; H04N 19/70; H04N 19/159; H04N 19/105; H04N 19/593; H04N 19/136; H04N 19/157; H04N 19/129; H04N 19/96; H04N 19/103; H04N 19/46; H04N 19/52
See application file for complete search history.

(56) References Cited

U.S. PATENT DOCUMENTS

| | | | | |
|---|---|---|---|---|
| 2014/0226721 | A1* | 8/2014 | Joshi | H04N 19/176 375/240.12 |
| 2016/0345030 | A1* | 11/2016 | Karczewicz | H04N 19/186 |
| 2017/0280163 | A1* | 9/2017 | Kao | H04N 19/593 |
| 2019/0306536 | A1 | 10/2019 | Lim et al. | |
| 2021/0014527 | A1 | 1/2021 | Iwamura et al. | |

FOREIGN PATENT DOCUMENTS

| | | |
|---|---|---|
| WO | 2019/189900 A1 | 10/2019 |
| WO | 2020/149608 A1 | 7/2020 |

OTHER PUBLICATIONS

Xiaozhong Xu et al., "Block Vector Prediction in Intra Block Copy for HEVC Screen Content Coding", 2015 Data Compression Conference, IEEE, 10 pages.

(Continued)

*Primary Examiner* — Farhan Mahmud
(74) *Attorney, Agent, or Firm* — Sughrue Mion, PLLC

(57) ABSTRACT

A method, computer program, and computer system is provided for video coding. Video data having one or more coding coefficients is received. A flipping or rotation operation is performed on the received video data based on selecting a scan region based coefficient coding definition to concentrate the coding coefficients in a scan region. The video data is decoded based on the selected scan region based coefficient coding definition.

20 Claims, 10 Drawing Sheets

(56) References Cited

OTHER PUBLICATIONS

Xiaozhong Xu et al., "Current Picture Referencing in Versatile Video Coding", 2019, IEEE Conference on Multimedia Information Processing and Retrieval (MIPR), 6 pages.

Xiaozhong Xu et al., "Intra Block Copy in HEVC Screen Content Coding Extensions", 2016, IEEE Journal on Emerging and Selected Topics in Circuits and Systems, 11 pages.

Xiaozhong Xu et al., "Intra block copy in Versatile Video Coding with Reference Sample Memory Reuse", 20XX IEEE, 5 pages.

Rajan Joshi et al., "High Efficiency Video Coding (HEVC) Screen Content Coding: Draft 4", Output Document JCTVC-U1005_r1, Joint Collaborative Team on Video Coding (JCT-VC) of ITU-T SG 16 WP 3 and ISO/IEC JTC 1/SC 29/WG 11, 21st Meeting, Jun. 2015, 663 pages, Warsaw, PL.

Xiang Li, et al., "Description of SDR video coding technology proposal by Tencent", Input Document: JVET-J0029-v1, Joint Video Experts Team (JVET) of ITU-T SG 16 WP 3 and ISO/IEC JTC 1/SC 29/WG 11, 10th Meeting, 2018, 34 pages, San Diego, US.

Benjamin Bross et al., "Versatile Video Coding (Draft 2)", Output Document: JVET-K1001-v6, Joint Video Experts Team (JVET) of ITU-T SG 16 WP 3 and ISO/IEC JTC 1/SC 29/WG 11, 11th Meeting, Jul. 2018, Ljubljana, SI, 141 pages.

Shan Liu et al., "Overview of HEVC extensions on screen content coding", SIP (2015), vol. 4, 12 page.

Wei Pu et al., "Palette Mode Coding in HEVC Screen Content Coding Extension", IEEE Journal on Emerging and Selected Topics in Circuits and Systems, Dec. 2016, 13 pages, vol. 6, No. 4.

Rajan Joshi et al., "Screen content coding test model 1 (SCM 1)", Output Document: JCTVC-Q1014, Joint Collaborative Team on Video Coding (JCT-VC) of ITU-T SG 16 WP 3 and ISO/IEC JTC 1/SC 29/WG 11 17th Meeting, Mar. 2014, Valencia, ES, 5 pages.

Yingbin Wang et al., "Intra Block Copy in AVS3 Video Coding Standard", Media Lab, Tencent, 2020 IEEE, 6 pates.

International Search Report dated Sep. 16, 2021 in International Application No. PCT/US2021/036426.

Written Opinion of the International Searching Authority dated Sep. 16, 2021 in International Application No. PCT/US2021/036426.

Extended European Search Report dated Oct. 25, 2022 in European Application No. 21862276.9.

Office Action dated Apr. 17, 2023 from the Japanese Patent Office in JP Application No. 2022-530794.

* cited by examiner

METHOD AND APPARATUS FOR TRANSFORM SKIP COEFFICIENTS CODING

CROSS-REFERENCE TO RELATED APPLICATION

This application claims priority based on U.S. Provisional Application No. 63/070,023 (filed Aug. 25, 2020), the entirety of which is incorporated by reference herein.

FIELD

This disclosure relates generally to field of data processing, and more particularly to video coding.

BACKGROUND

In the AVS standard, a technique of residue coding was proposed, referred as SRCC (scan region based coefficient coding). Regions in the transform block may be labeled such that non-zero coefficients only exist inside the labeled region. On the other hand, any locations outside the region should only have zero coefficients. This region is referred as the scan region.

SUMMARY

Embodiments relate to a method, system, and computer readable medium for video coding. According to one aspect, a method for video coding is provided. The method may include receiving video data having one or more coding coefficients. A flipping or rotation operation is performed on the received video data based on selecting a scan region based coefficient coding definition to concentrate the coding coefficients in a scan region. The video data is decoded based on the selected scan region based coefficient coding definition.

According to another aspect, a computer system for video coding is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving video data having one or more coding coefficients. A flipping or rotation operation is performed on the received video data based on selecting a scan region based coefficient coding definition to concentrate the coding coefficients in a scan region. The video data is decoded based on the selected scan region based coefficient coding definition.

According to yet another aspect, a computer readable medium for video coding is provided. The computer readable medium may include one or more computer-readable storage devices and program instructions stored on at least one of the one or more tangible storage devices, the program instructions executable by a processor. The program instructions are executable by a processor for performing a method that may accordingly include receiving video data having one or more coding coefficients. A flipping or rotation operation is performed on the received video data based on selecting a scan region based coefficient coding definition to concentrate the coding coefficients in a scan region. The video data is decoded based on the selected scan region based coefficient coding definition.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video coding. The following described exemplary embodiments provide a system, method and computer program to, among other things, encode and decode video data. Therefore, some embodiments have the capacity to improve the field of computing by allowing for increased efficiency in coding video data.

As previously described, the AVS standard, a technique of residue coding was proposed, referred as scan region based coefficient coding (SRCC). Regions in the transform block may be labeled such that non-zero coefficients only exist inside the labeled region. On the other hand, any locations outside the region should only have zero coefficients. This region is referred as the scan region. However, related coding information is not considered for arranging the coefficients' distribution. It may be advantageous, therefore, to concentrate the non-zero coefficients and reduce the size of SRCC region in order to improve the efficiency of the rotation and similar operations.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Figure 1:
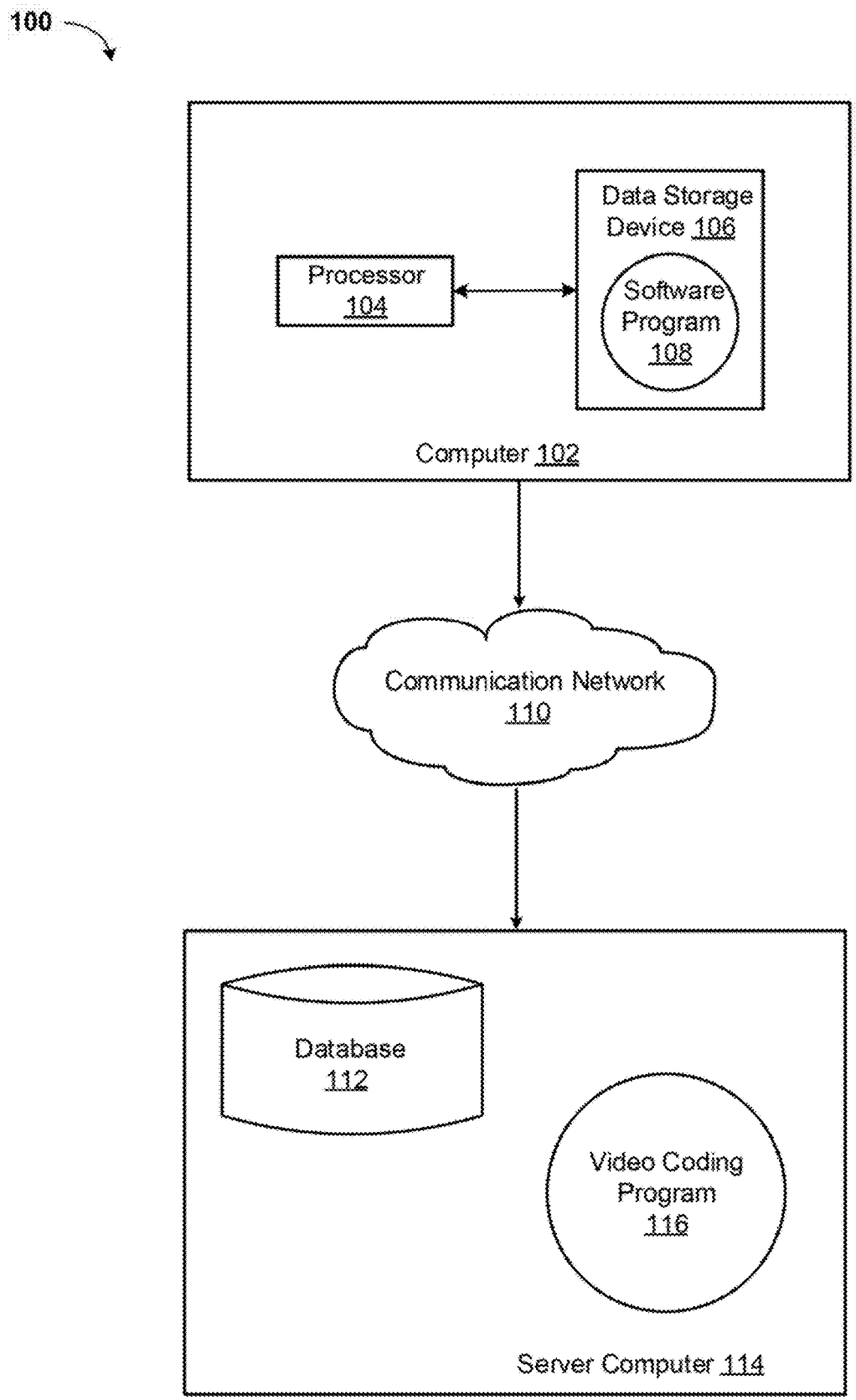
FIG. 1 illustrates a networked computer environment according to at least one embodiment.

The following described exemplary embodiments provide a system, method and computer program that encodes and decodes video data based on SRCC definitions. Referring now to FIG. 1, a functional block diagram of a networked computer environment illustrating a video coding system 100 (hereinafter "system") for encoding and decoding video data based on SRCC definitions. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for video encoding and decoding based on SRCC definitions is enabled to run a Video Coding Program 116 (hereinafter "program") that may interact with a database 112. The Video Coding Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger video coding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2A:
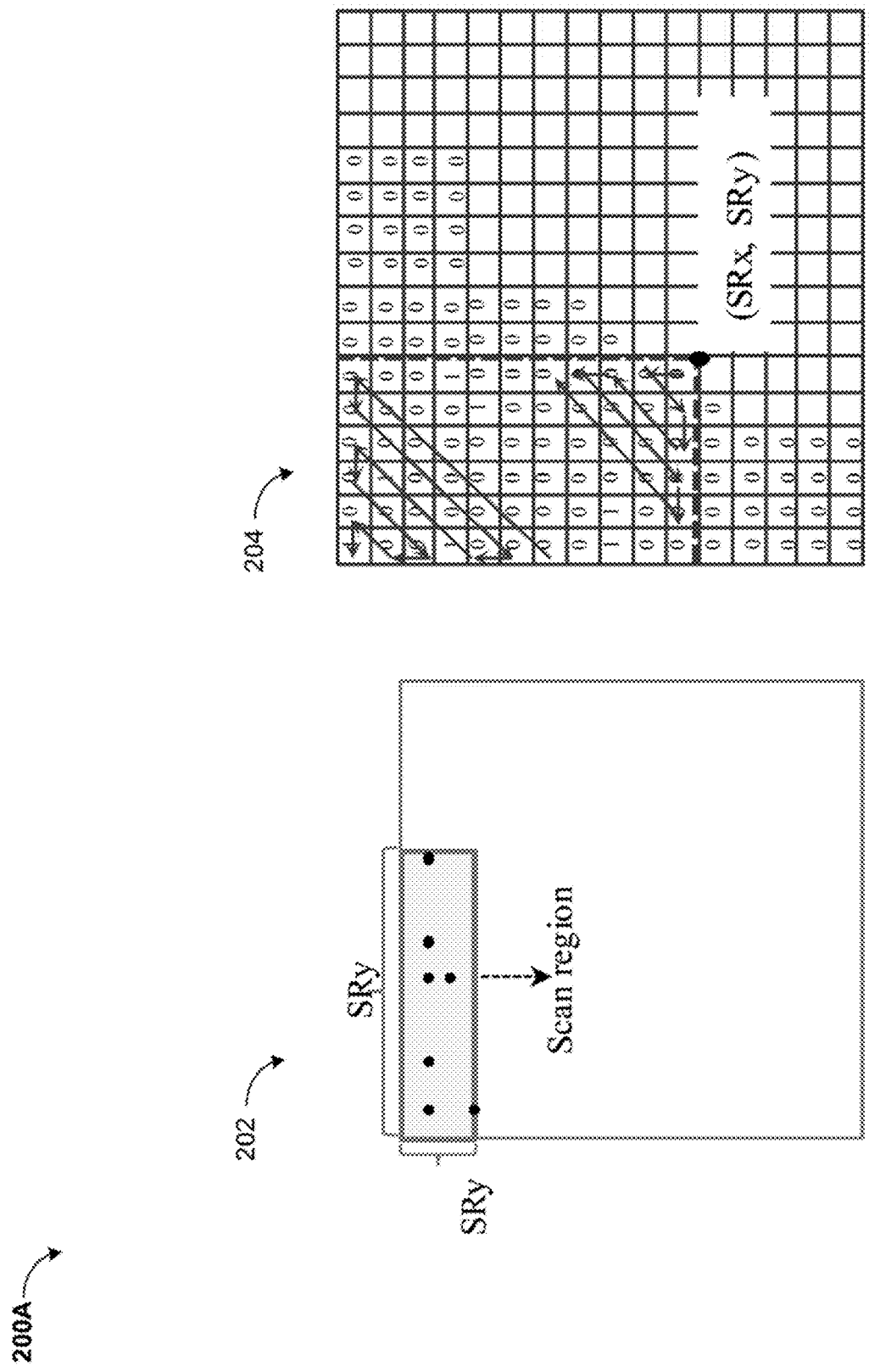
FIG. 2A is a diagram of scan region based coefficient coding (SRCC), according to at least one embodiment.

Referring now to FIG. 2A, a diagram 200A of scan region based coefficient coding (SRCC) is depicted. The diagram 200A may include a scan region 202 and a scan order 204 in a scan region. The scan region 202 may be signaled by coding the two dimensions of the region (SRx, SRy). SRx can be as small as 1 and as large as the transform block width. SRy can be as small as 1 and as large as the transform block height. When coding these two parameters, the value of SRx-1 and SRy-1 may be coded. For coefficients inside the scan region, a reverse zig-zag scan order is provided to code the positions of the coefficients. From the decoder point of view, a coefficient block after decoding the SRCC region, is subject to inverse transform, before applying inverse quantization to them. After inverse quantization, the residue block is acquired, which will be added to the prediction block to form the reconstruction block before any loop filtering.

Figure 2B:
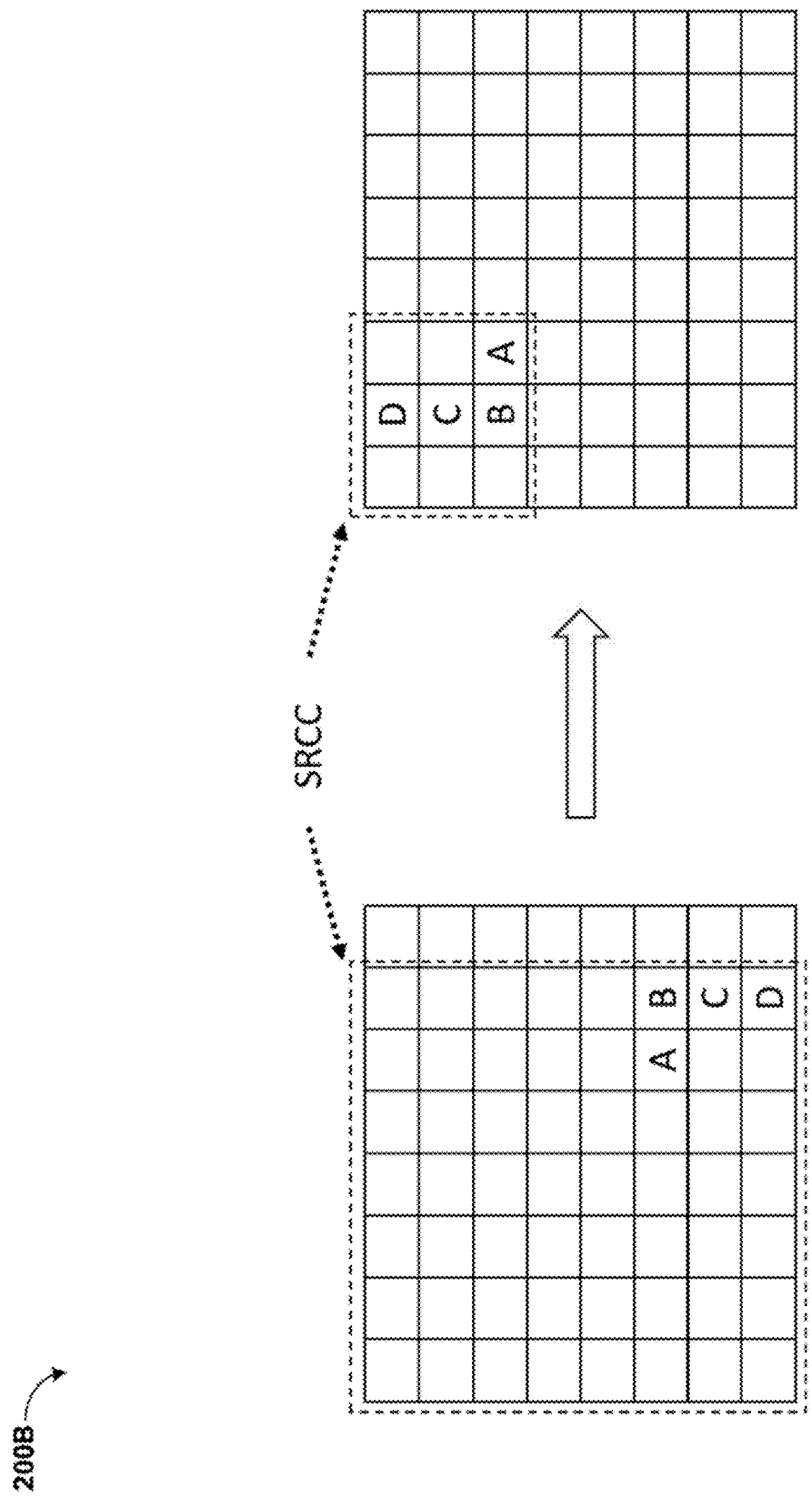
FIG. 2B is a diagram of rotation of a residue block and corresponding SRCC region definitions, according to at least one embodiment.

Referring now to FIG. 2B, a diagram 200B of rotation of a residue block and corresponding SRCC region definitions is depicted. The diagram 200B may include non-zero coefficients A-D. The dotted blocks are the SRCC regions before and after the rotation. After the decoding the SRCC region, the coefficients may perform a reverse 180-degree operation to restore the original distribution of the coefficients in the block.

According to one or more embodiments, the inverse transform module can be optionally removed, meaning the coefficient block can directly be treated with inverse quantization to form the residue block. In the encoder side, this means equivalently to skip the transform coding stage of the video codec. Therefore this technique is referred as transform skip (TS).

For a residue block, if applicable, the encoder may choose between applying a transform or skip the transform, before the quantization stage. The selection can be explicit by signaling a flag of choice or implicit by analyzing the statistics of the coefficients, such as the parity of the sum of coefficients. When TS is selected, the later operations such as SRCC and coefficient value coding are still applied and reuse what are designed for transform coefficient coding.

SRCC works for transform coefficient coding because after transform, the non-zero coefficients tend to converge into top and left part of the block, leaving many zero coefficients on the right and bottom part of the block after quantization. Unlike transformed coefficients, when transform skip is applied, the distribution of non-zero residue coefficients may not concentrate on the top and left part of the block. Instead, it can be allocated more on the bottom-right part of the block for intra coded blocks. A 180-degree rotation to the intra coded residue block may be performed before calculating the SRCC region.

Figure 2C:
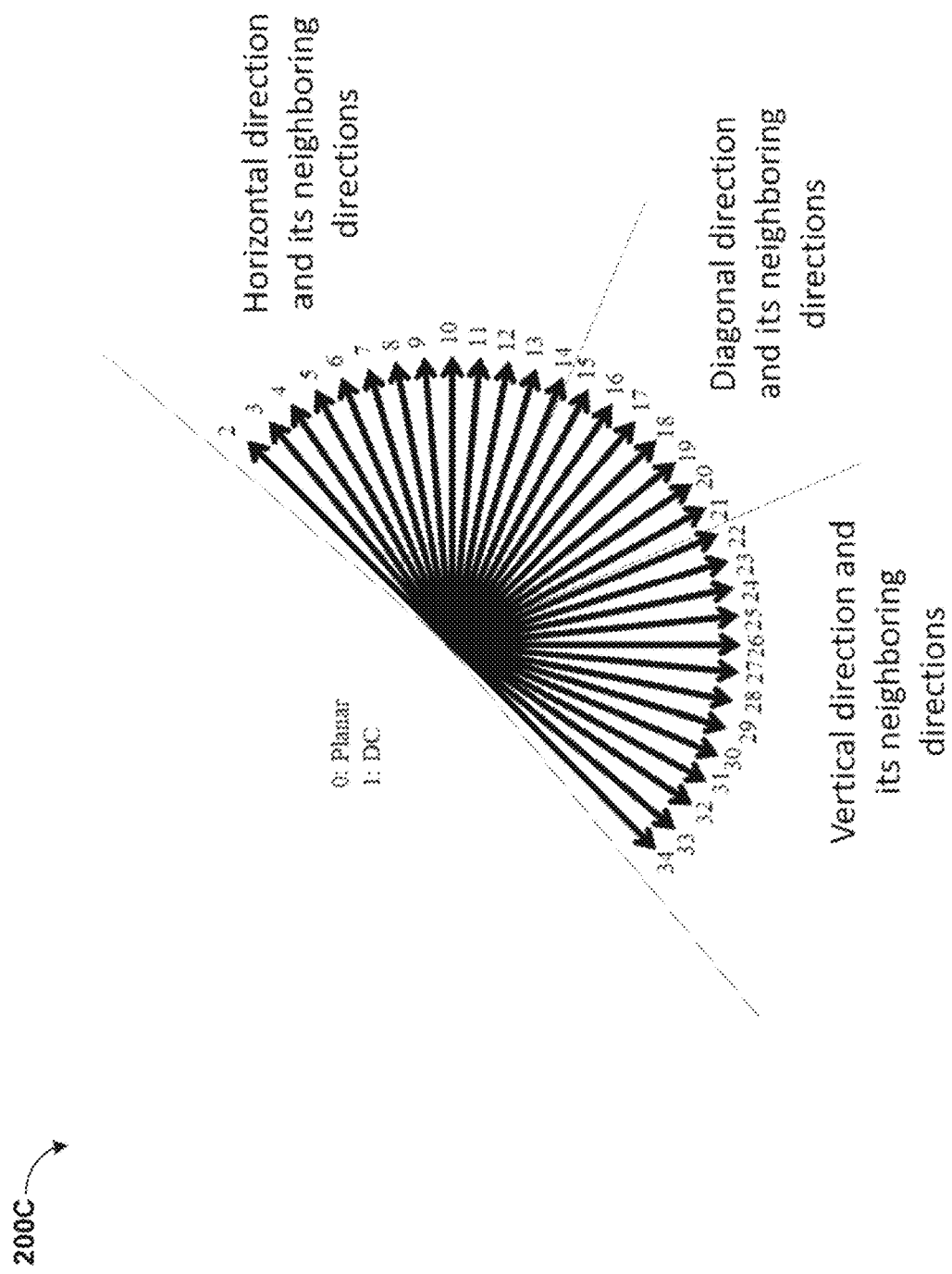
FIG. 2C is a diagram of intra prediction direction classifications, according to at least one embodiment.

Referring now to FIG. 2C, a diagram 200C of intra prediction direction classifications is depicted. Intra prediction directions may be classified into 3 directional classes, including horizontal, vertical and diagonal direction groups. Non-directional modes including planar and DC modes may be put into diagonal direction group. According to one or more embodiments, operations other than 180-degree rotation to the coefficient block. Example of such operation include horizontal flipping and vertical flipping, 90-degree rotation, 270 (−90)-degree rotation, etc. These operations can replace 180-degree rotation or use as additional options. In one embodiment, the selection is done by explicit signaling which of the options is used for a coding block. In another embodiment, the selection is done by implicitly inferring from the intra prediction directions used in the current block, if intra coded.

For each particular intra prediction mode, a corresponding operation (including 180-degree rotation, horizontal flipping, vertical flipping, etc) is assigned. More specifically, the entire intra prediction set can be divided according to the directionality. For example, horizontal prediction direction and its neighboring directions infer the use of horizontal flipping; vertical prediction direction and its neighboring directions infer the use of vertical flipping; diagonal direction (including prediction directions from one or more of top-left, top-right and bottom-left reference samples to current sample) and its neighboring directions infer the use of 180-degree rotation.

Figure 2D:
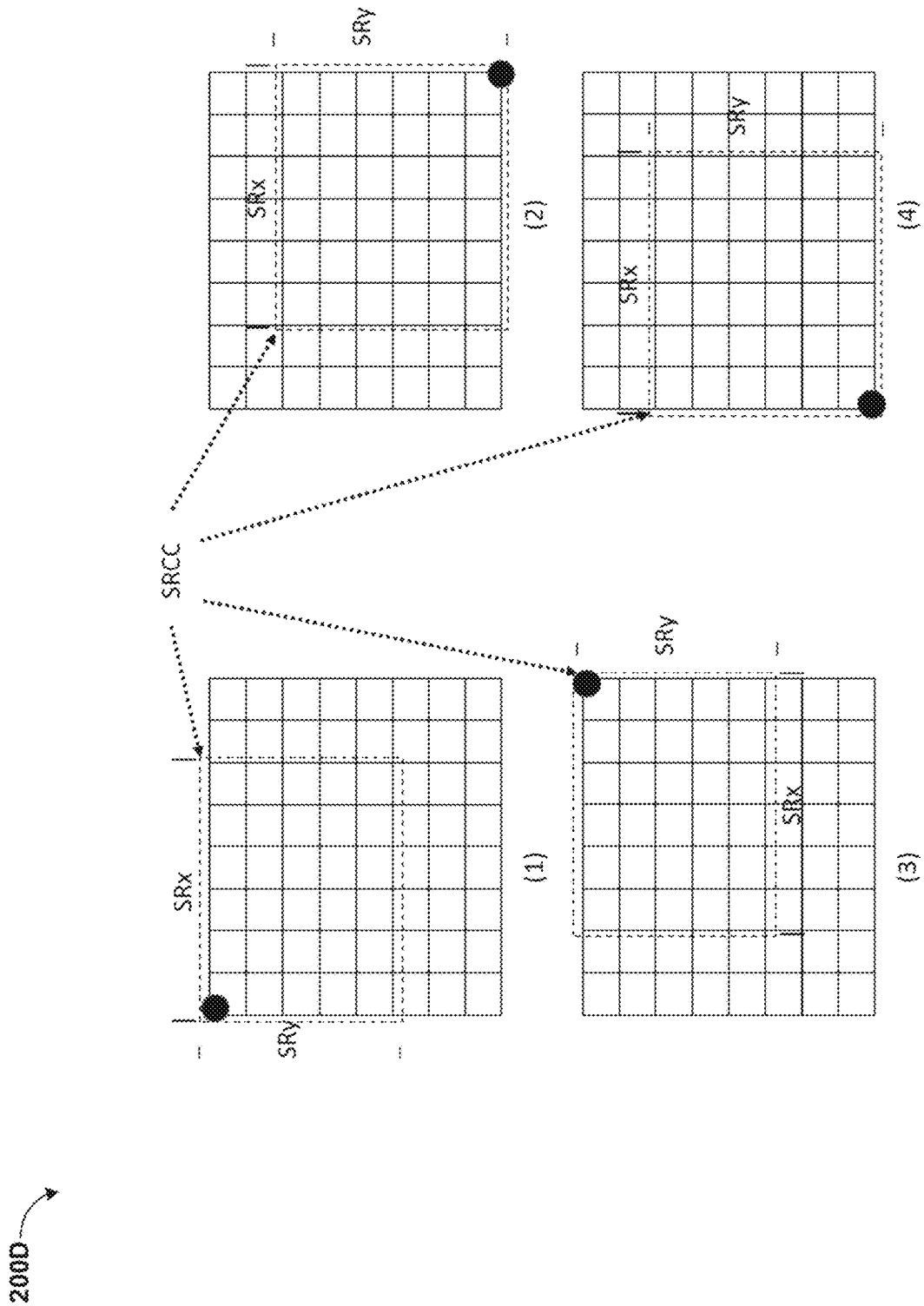
FIG. 2D is a diagram of SRCC region definitions, according to at least one embodiment.

Referring now to FIG. 2D, a diagram 200D of SRCC region definitions is depicted. The diagram 200D describes four states (1)-(4)—for the SRCC region definitions. The black dot represents the origin of the SRCC region, which determines the meaning of SRx and SRy to be signals as the region size. According to one or more embodiments, alternative definition of SRCC regions may be considered. Assuming the original region starts from top-left corner of the current block, it can also be started from bottom-right, top-right and top-left corners. For example, three alternative SRCC regions are provided in addition to the original one. For each residue block (of TS mode) or transform coefficient block (of transform mode), one can choose from more than one possible SRCC region definition.

The coding of SRx and SRy, and the scanning order within the region can be the same as the original method in traditional SRCC (reverse zig-zag scan order from the bottom right part of the region). After decoding the coefficients in the SRCC region, according to which alternative one in states (2)-(4) used, a shift in coefficient location inside the block may be needed. For example, state (2) may include a block with dimension (width, height) and the SRCC size (SRx, SRy). Initially, the coefficients in SRCC will be decoded and stored in the top-left part of the block, in a similar way as in state (1). After that, coefficients in the top-left SRCC region should be shifted to bottom right part, to restore their original locations. More specifically, each coefficient should shift (width-SRx) to the right and (height-SRy) to the bottom in position. Similar shifting to the right applies to state (3) and to the bottom applies to state (4).

The rotation or flipping operation may not be needed to concentrate the non-zero coefficients into the SRCC region. According to one or more embodiments, criteria may be used to selected which of the SRCC region definitions may be used. In one embodiment, for transform skip block, the bottom-right corner may always be selected as the SRCC region origin. In another embodiment, for transform skip block, the SRCC region origin is determined by the intra prediction mode. In one example, horizontal direction group selects top-right corner as origin, the vertical direction group selects bottom-left corner as origin, and the diagonal direction group selects the bottom-right corner as origin. In another embodiment, for transform skip block, the SRCC region origin is determined by the intra prediction mode. In another embodiment, for transform skip block, it SRCC region origin selection can be explicitly signaled.

The scan order inside each SRCC region definition may always start from bottom-right corner of the region, in reverse zig-zag order. Alternatively, the scan can have other directions or other scan types, such as scanning from top-left corner of the SRCC region, or/and use diagonal scans, etc.

For intra block copy or inter coded blocks, 180-degree rotation of coefficient block may always be applied to IBC/inter coded block, if coded in TS mode. Alternatively, the bottom-right corner of SRCC region origin may always be applied to IBC/inter coded block, if coded in TS mode.

Figure 2E:
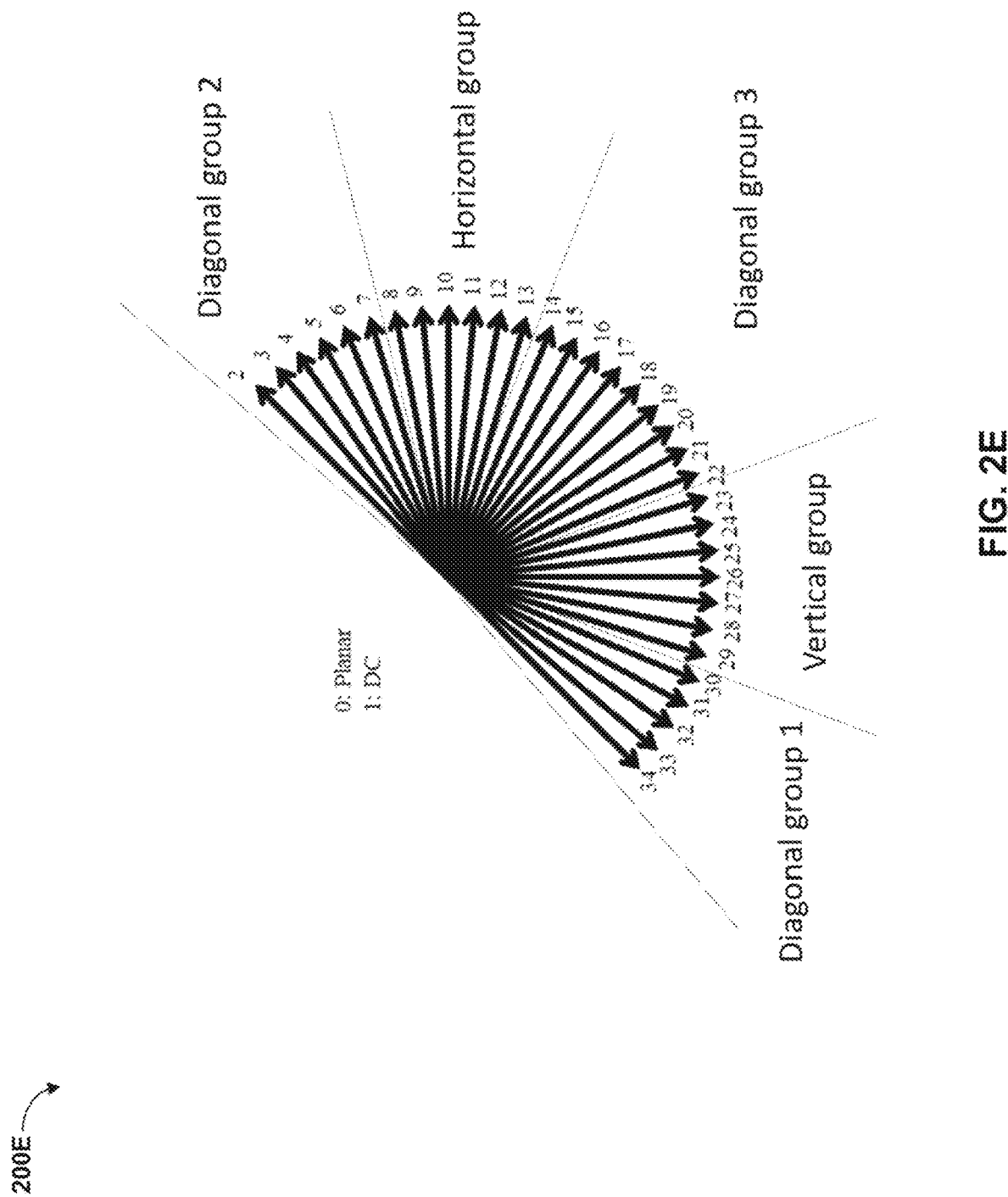
FIG. 2E is a diagram of classifying intra prediction directions into five directional classes, according to at least one embodiment.

Referring now to FIG. 2E, a diagram 200E of classifying intra prediction directions into five directional classes, including horizontal, vertical and three diagonal direction groups is depicted. Non-directional modes including planar and DC modes may be put into diagonal direction group. The horizontal group, vertical group, and the diagonal group 3 may select the top-right corner as the origin. The diagonal group 1 may select the bottom-left corner as origin (with reference samples from the top-right side). The diagonal group 2 may select the top-right corner as origin (with reference samples from the bottom-left side).

Figure 3:
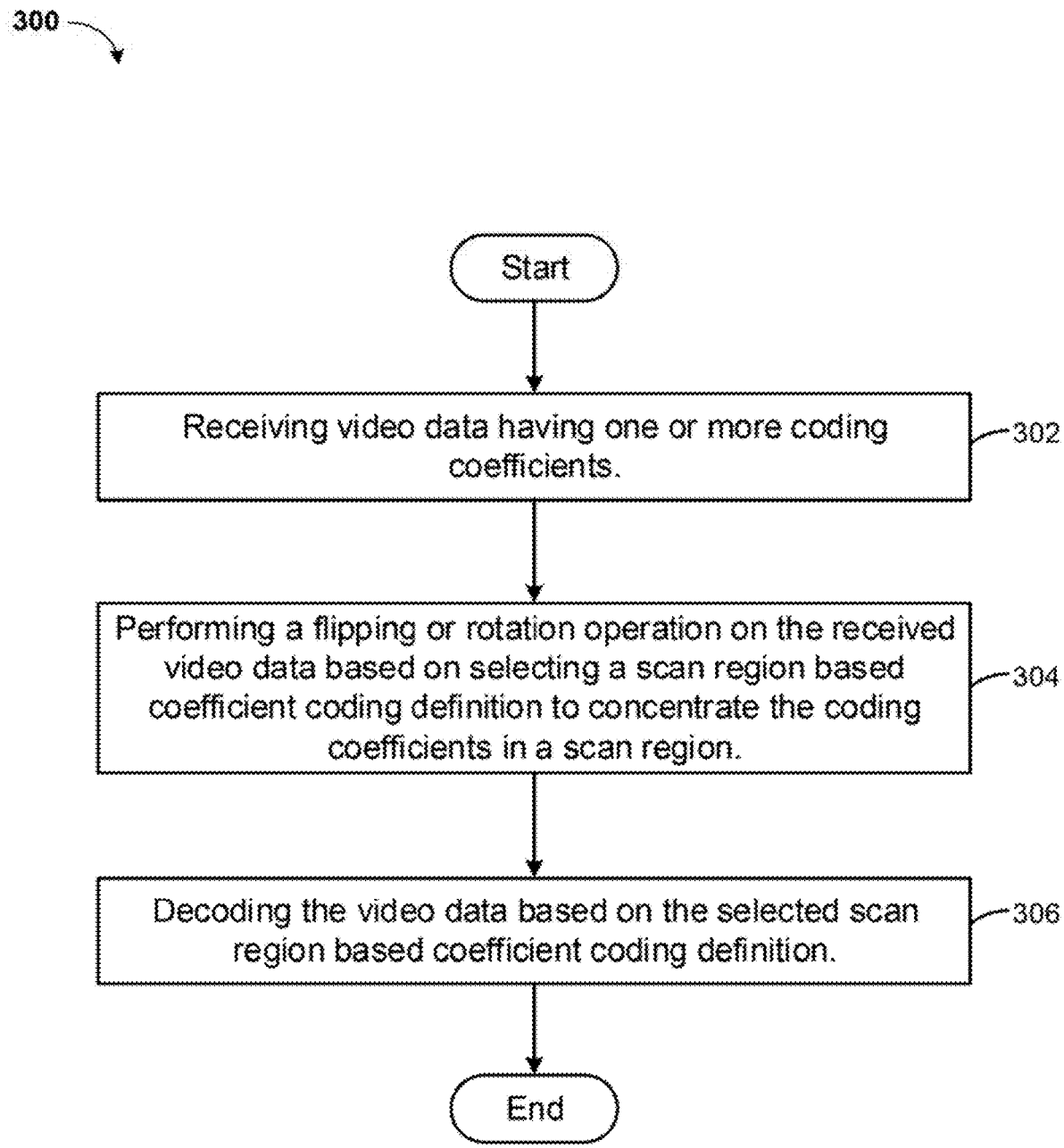
FIG. 3 is an operational flowchart illustrating the steps carried out by a program that encodes and decodes video data based on SRCC definitions, according to at least one embodiment.

Referring now to FIG. 3, an operational flowchart illustrating the steps of a method 300 carried out by a program that encodes and decodes video data based on SRCC definitions is depicted.

At 302, the method 300 may include receiving video data having one or more coding coefficients.

At 304, the method 300 may include performing a flipping or rotation operation on the received video data based on selecting a scan region based coefficient coding definition to concentrate the coding coefficients in a scan region.

At 306, the method 300 may include decoding the video data based on the selected scan region based coefficient coding definition.

It may be appreciated that FIG. 3 provides only an illustration of one implementation and does not imply any limitations with regard to how different embodiments may be implemented. Many modifications to the depicted environments may be made based on design and implementation requirements.

Figure 4:
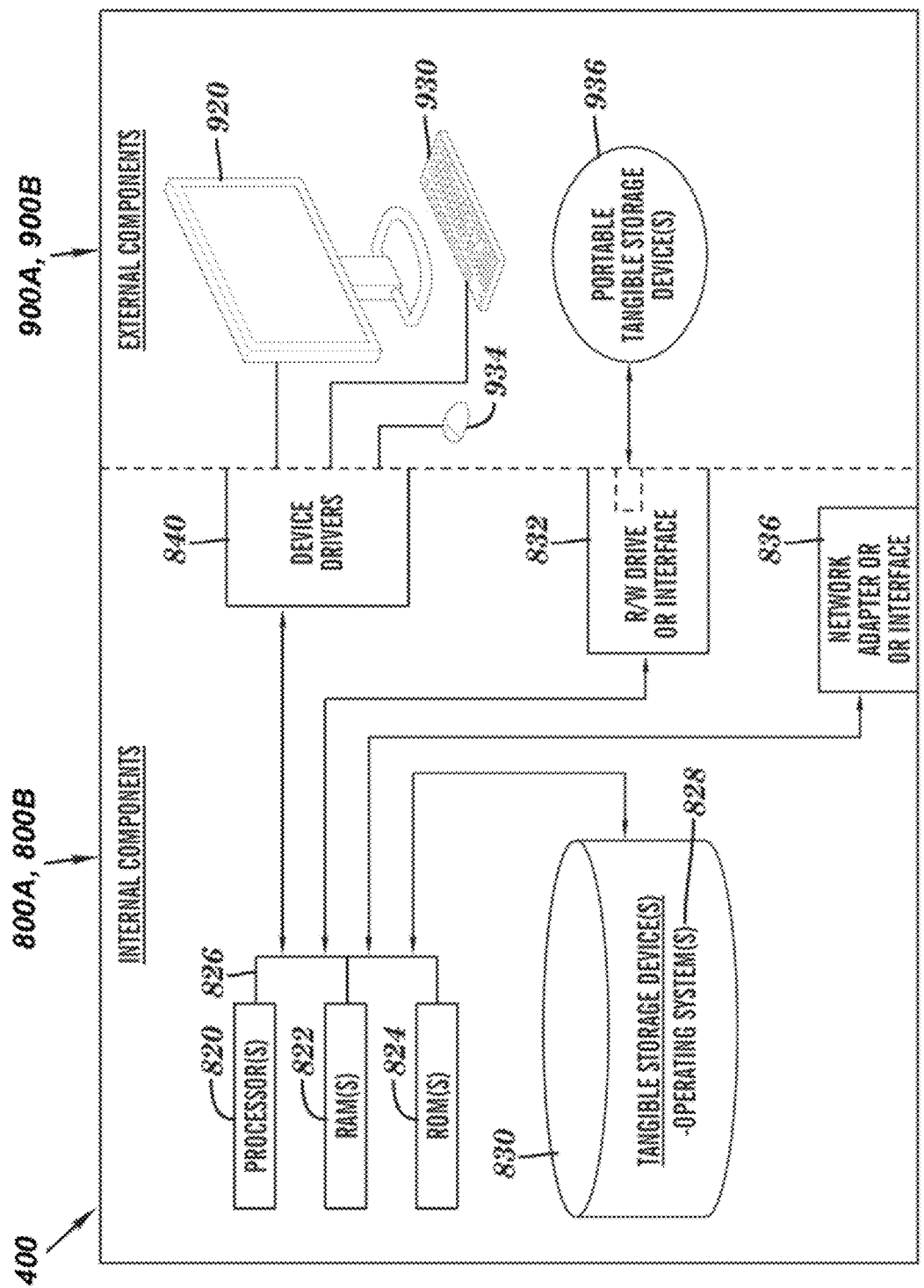
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Figure 5:
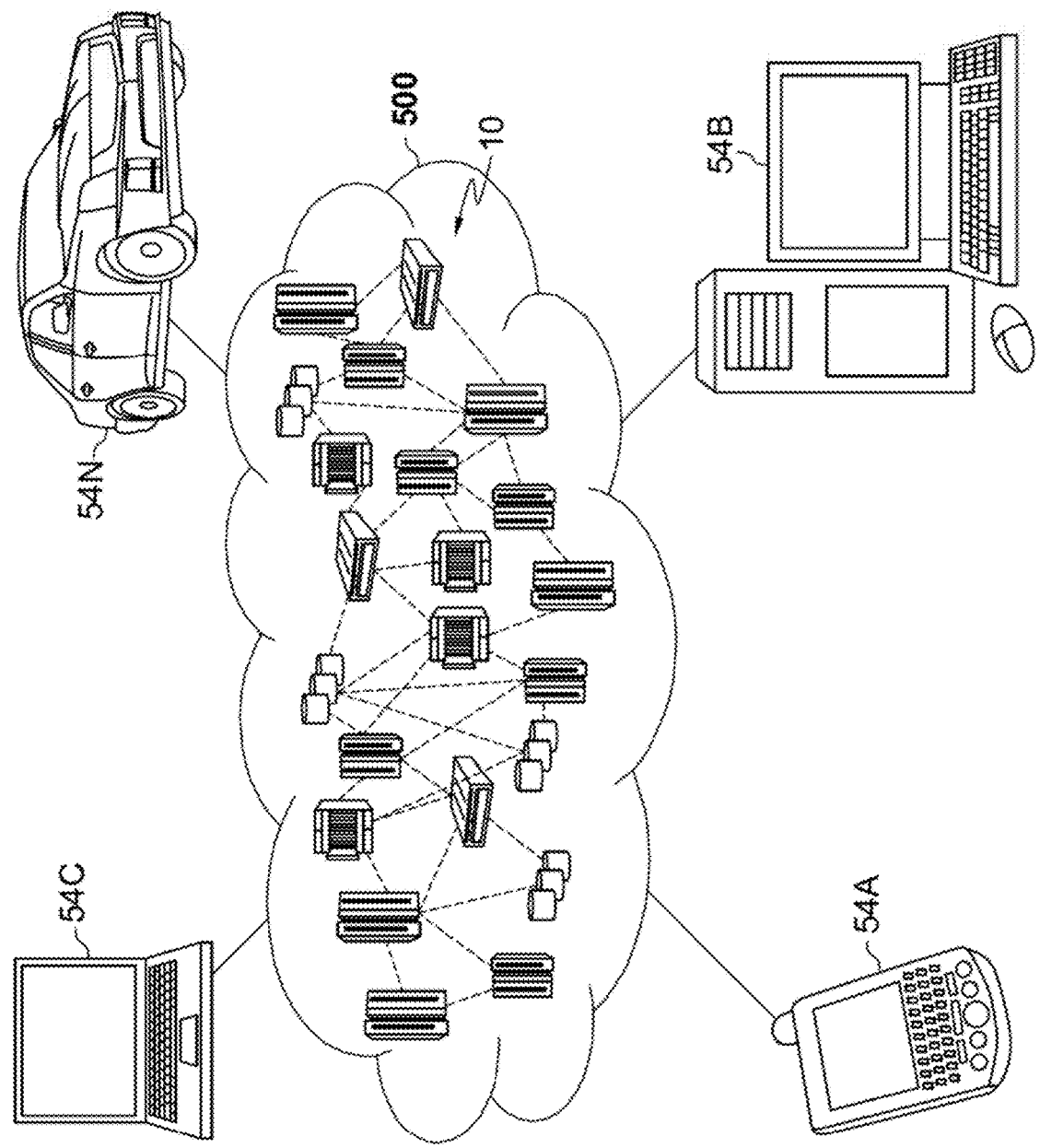
FIG. 5 is a block diagram of an illustrative cloud computing environment including the computer system depicted in FIG. 1, according to at least one embodiment.

Computer 102 (FIG. 1) and server computer 114 (FIG. 1) may include respective sets of internal components 800A,B and external components 900A,B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Video Coding Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Video Coding Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Video Coding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Video Coding Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
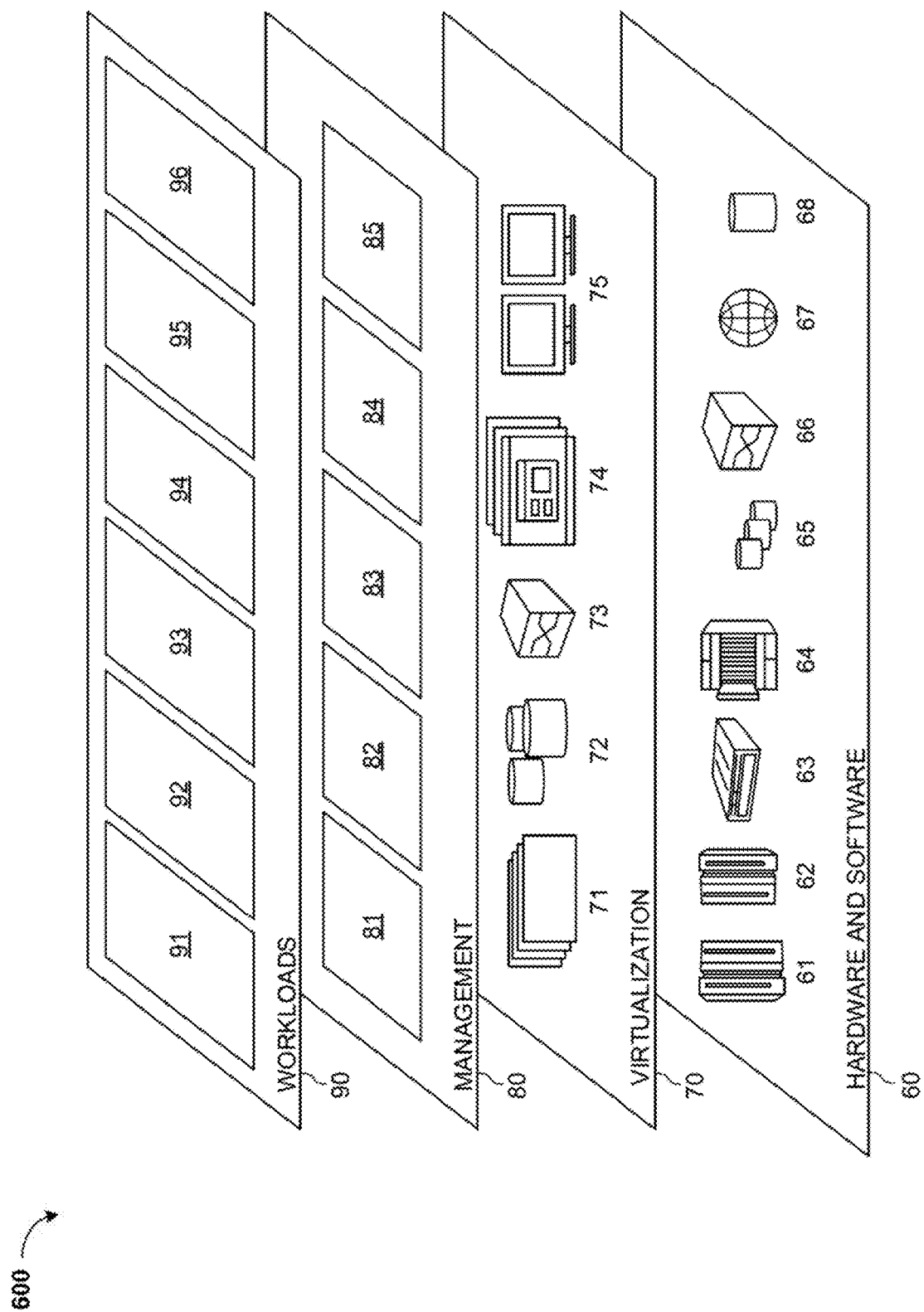
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Video Coding 96. Video Coding 96 may encode and decode video data based on SRCC definitions.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of video coding, executable by a processor, comprising:
   receiving video data having one or more coding coefficients;
   performing a flipping operation on the received video data based on selecting a scan region based coefficient coding definition to concentrate the coding coefficients in a scan region, wherein the flipping operation is one of a horizontal flipping operation, a vertical flipping operation, or a diagonal flipping operation, wherein intra prediction set is classified based on directionality, and wherein the horizontal flipping operation is performed based on the directionality of an intra prediction mode associated with the received video data being classified as a neighboring direction of a horizontal prediction direction, the vertical flipping operation is performed based on the directionality of the intra prediction mode associated with the received video data being classified as a neighboring direction of a vertical prediction direction, wherein the diagonal flipping operation is performed based on the directionality of the intra prediction mode associated with the received video data being classified as a neighboring direction of a diagonal prediction direction; and
   decoding the video data based on the selected scan region based coefficient coding definition.

2. The method of claim 1, wherein the scan region based coefficient coding definition is selected based on explicit signaling of the parameters used for a coding block.

3. The method of claim 1, wherein the scan region based coefficient coding definition is selected based on implicitly inferring from intra prediction directions used in an intra coded current block.

4. The method of claim 1, wherein the flipping operation is performed based on identifying an origin point in the received video data corresponding to the selected scan region based coefficient coding definition.

5. The method of claim 4, wherein the origin point is determined by an intra prediction mode associated with the received video data.

6. The method of claim 1, wherein the horizontal flipping operation is performed based on the directionality of the intra prediction mode associated with the received video data being the horizontal prediction direction, and wherein the vertical flipping operation is performed based on the directionality of the intra prediction mode associated with the received video data being the vertical prediction direction.

7. The method of claim 1 wherein a height and a width associated with the scan region are defined.

8. A computer system for video coding, the computer system comprising:
   one or more computer-readable non-transitory storage media configured to store computer program code; and
   one or more computer processors configured to access said computer program code and operate as instructed by said computer program code, said computer program code including:
     receiving code configured to cause the one or more computer processors to receive video data having one or more coding coefficients;
     performing code configured to cause the one or more computer processors to perform a flipping operation on the received video data based on selecting a scan region based coefficient coding definition to concentrate the coding coefficients in a scan region, wherein the flipping operation is one of a horizontal flipping operation, a vertical flipping operation, or a diagonal flipping operation, wherein intra prediction set is classified based on directionality, and wherein the horizontal flipping operation is performed based on the directionality of an intra prediction mode associated with the received video data being classified as a neighboring direction of a horizontal prediction direction, the vertical flipping operation is performed based on the directionality of the intra prediction mode associated with the received video data being classified as a neighboring direction of a vertical prediction direction, wherein the diagonal flipping operation is performed based on the directionality of the intra prediction mode associated with the received video data being classified as a neighboring direction of a diagonal prediction direction; and
     decoding code configured to cause the one or more computer processors to decode the video data based on the selected scan region based coefficient coding definition.

9. The computer system of claim 8, wherein the scan region based coefficient coding definition is selected based on explicit signaling of the parameters used for a coding block.

10. The computer system of claim 8, wherein the scan region based coefficient coding definition is selected based on implicitly inferring from intra prediction directions used in an intra coded current block.

11. The computer system of claim 8, wherein the flipping operation is performed based on identifying an origin point in the received video data corresponding to the selected scan region based coefficient coding definition.

12. The computer system of claim 11, wherein the origin point is determined by an intra prediction mode associated with the received video data.

13. The computer system of claim 11, wherein the origin point is explicitly signaled.

14. The computer system of claim 8, wherein a height and a width associated with the scan region are defined.

15. A non-transitory computer readable medium having stored thereon a computer program for video coding, the computer program configured to cause one or more computer processors to:
receive video data having one or more coding coefficients;
perform a flipping operation on the received video data based on selecting a scan region based coefficient coding definition to concentrate the coding coefficients in a scan region, wherein the flipping operation is one of a horizontal flipping operation, a vertical flipping operation, or a diagonal flipping operation, wherein intra prediction set is classified based on directionality, and wherein the horizontal flipping operation is performed based on the directionality of an intra prediction mode associated with the received video data being classified as a neighboring direction of a horizontal prediction direction, the vertical flipping operation is performed based on the directionality of the intra prediction mode associated with the received video data being classified as a neighboring direction of a vertical prediction direction, wherein the diagonal flipping operation is performed based on the directionality of the intra prediction mode associated with the received video data being classified as a neighboring direction of a diagonal prediction direction; and
decode the video data based on the selected scan region based coefficient coding definition.

16. The computer readable medium of claim 15, wherein the scan region based coefficient coding definition is selected based on explicit signaling of the parameters used for a coding block.

17. The computer readable medium of claim 15, wherein the scan region based coefficient coding definition is selected based on implicitly inferring from intra prediction directions used in an intra coded current block.

18. The computer readable medium of claim 15, wherein the flipping operation is performed based on identifying an origin point in the received video data corresponding to the selected scan region based coefficient coding definition.

19. The computer readable medium of claim 18, wherein the origin point is determined by an intra prediction mode associated with the received video data.

20. The computer readable medium of claim 18, wherein the origin point is explicitly signaled.

* * * * *